United States Patent [19]
Siegel

[11] Patent Number: 6,084,493
[45] Date of Patent: Jul. 4, 2000

[54] ELECTROMAGNETIC VALVE WITH INTEGRATED NON-RETURN VALVE

[75] Inventor: Heinz Siegel, Stuttgart, Germany

[73] Assignee: Robert Bosch GmbH, Stuttgart, Germany

[21] Appl. No.: 09/380,767

[22] PCT Filed: Nov. 17, 1997

[86] PCT No.: PCT/DE97/02698

§ 371 Date: Sep. 13, 1999

§ 102(e) Date: Sep. 13, 1999

[87] PCT Pub. No.: WO98/40258

PCT Pub. Date: Sep. 17, 1998

[30] Foreign Application Priority Data

Mar. 13, 1997 [DE] Germany .................. 197 10 353

[51] Int. Cl.$^7$ ........................................... H01F 7/00
[52] U.S. Cl. ............... 335/278; 335/220; 251/129.15
[58] Field of Search .................... 335/220, 278, 335/279, 281, 282; 251/129.01, 129.15, 129.16, 129.17, 129.18, 129.19, 129.2, 129.21, 129.22

[56] References Cited

U.S. PATENT DOCUMENTS 4,988,967 1/1991 Miller et al. .............. 251/129.01
5,476,243 12/1995 Oehler et al. ............. 251/129.01

*Primary Examiner*—Lincoln Donovan
*Attorney, Agent, or Firm*—Ronald E. Greigg; Edwin E. Greigg

[57] ABSTRACT

A magnet valve having a rod-like base body for insertion into a stepped bore of a hydraulic block through which a valve tappet reaches a valve closing ball and on whose face end remote to an armature a cup-shaped sleeve is mounted. A valve seat of the magnet valve is embodied on the bottom of the cup-shaped sleeve. In order to make a large flow cross section available for a flow through the magnet valve in one flow direction, a check valve is integrated with the magnet valve and that to this end flow openings are disposed on an imaginary circle in the bottom of the cup-shaped sleeve. The openings are closed by an annular valve closing body of the check valve. The magnet valve of the invention is intended particularly for use as a brake pressure buildup valve for a wheel brake cylinder of a slip-controlled vehicle brake system.

19 Claims, 4 Drawing Sheets ns. Shown are:
ELECTROMAGNETIC VALVE WITH INTEGRATED NON-RETURN VALVE

PRIOR ART

The invention relates to a magnet valve with an integrated check valve. The magnet valve is intended for use as a brake pressure buildup valve, preceding a wheel brake cylinder, for a slip-controlled hydraulic vehicle brake system.

One such magnet valve is known from European Patent Disclosure EP 0 673 815 A3. Its housing is embodied as a cup-shaped sleeve with a two-piece bottom, and into this bottom a disk is inserted which has a central through bore with a valve seat on the top for an armature-actuated valve closing body. Laterally beside this flow opening, the disk has a second flow opening with a valve seat on the underside for a check valve. The flow openings have approximately the same diameter. A ball—or plate—like closing member of the check valve is received in a turned recess of the disk. A retaining part for the closing member is also located in the turned recess and is made from thin-walled sheet metal.

The known magnet valve is relatively expensive, because its housing and the disk on the bottom must be made by metal-cutting machining in an expensive way, and the closing member of the check valve and the retaining part must be inserted into the disk and the thus-supplemented disk must be inserted into the housing and secured therein by a wedged connection.

From German Patent Disclosure DE 40 30 971 A1, a magnet valve is known which has a rotationally symmetrical base body with an axial through bore. On one face end of the base body, an armature is disposed, which can be actuated by supplying current to a coil. Via a valve tappet, which reaches through the through bore of the base body, the armature actuates a valve closing body on the other side of the base body. On the side of the valve closing body, a sleeve is mounted on the base body, and the valve closing body is located in its interior. A disk-like valve seat carrier is inserted into the sleeve and has a flow opening with a valve seat with which the valve closing body of the magnet valve cooperates. The disklike valve seat carrier forms a kind of bottom of the sleeve. Below the valve seat carrier, a disk with a throttle bore, a screen filter disk, and a spacer disk between the disk having the throttle bore and the screen filter disk are received in the sleeve.

ADVANTAGES OF THE INVENTION

The magnet valve of the invention can be made especially economically, because the sleeve embodied in one piece with the bottom can be made, including the flow openings and the valve seat, without metal-cutting machining in a much more economical way than the corresponding item in the magnet valve of the generic type. Furthermore, the joining of the valve closing body of the check valve is made easier by its disposition outside the cup-shaped sleeve. Furthermore, in the embodiment of the magnet valve of the invention with a plurality of flow openings for the check valve, there is the substantial advantage that in comparison with the prior art, a flow cross section that is multiple times larger is available. When the magnet valve is used as intended as a break pressure buildup valve, the check valve as a result of this embodiment can have a flow through it in the direction from the wheel brake cylinder to the master cylinder and accordingly opens when the wheel brake pressure drops at the end of a breaking operation. This has the advantage that the reduction in the wheel brake pressure at the end of the braking operation is speeded up.

BRIEF DESCRIPTION OF THE DRAWINGS

The invention will be described in further detail below in terms of three exemplary embodiments shown in the drawings. Shown are.

DESCRIPTION OF THE EXEMPLARY EMBODIMENTS

Figure 1:
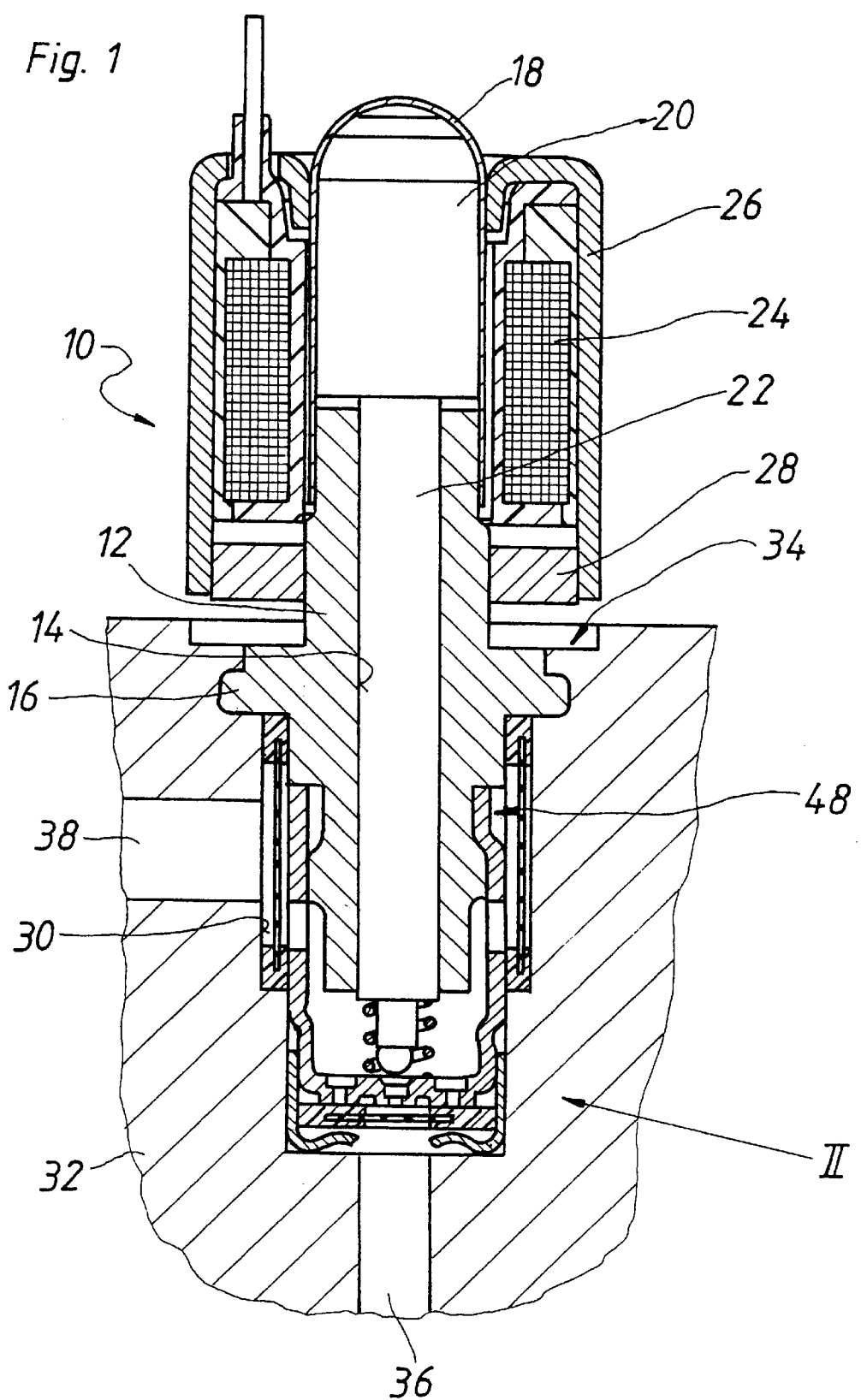
FIG. 1, an axial section through a magnet valve of the invention.

The magnet valve 10 of the invention, shown in FIG. 1, has an approximately rod-like base body 12 with an axial through bore 14 and an annular collar 16, integral with the base body, in its middle region. A valve dome 18 is mounted on one face end of the base body 12, and an armature 20 is axially displaceably received in the dome. A valve tappet 22, which reaches through the through bore 14 of the base body 12, is connected to the armature 20.

The valve dome 18 is surrounded by a coil 24, which in turn is surrounded by a cup-shaped yoke 26, into whose open face end a yoke bottom 28 in the form of a perforated disk is inserted. For actuation of the magnet valve 10, current is supplied to the coil 24, and as a result, in a manner known per se, the armature 20 is moved axially toward the base body 12. The valve tappet 22 is displaced along with the armature 20.

The annular collar 16 of the base body 12 is spaced apart from the yoke bottom 28; the base body 12 protrudes axially out of the yoke 26, 28 that surrounds the coil 24. The magnet valve 10 is inserted by the protruding portion of the base body 12 into a stepped bore 30 of a hydraulic block 32, of which only a fragment in the region of the magnet valve 10 is shown in FIG. 1. The annular collar 16 is countersunk in the hydraulic block 32, and the magnet valve 10 is secured to the annular collar 16 in the hydraulic block 32 by calking (34).

The magnet valve 10 of the invention shown in FIG. 1 is intended as a pressure buildup valve of a slip-controlled vehicle brake system, known per se and not otherwise shown here. Other components, not shown, of the vehicle brake system, such as magnet valves or a return pump, are inserted into the hydraulic block 32 and connected hydraulically to one another and to the magnet valve 10. By means of a fluid conduit 36 discharging axially into the stepped bore 30, the magnet valve 10 is connected (indirectly) to a master cylinder, not shown, and by way of a fluid conduit 38 discharging radially into the stepped bore 30, a wheel brake cylinder, not shown, is connected to the magnet valve 10.

Figure 2:
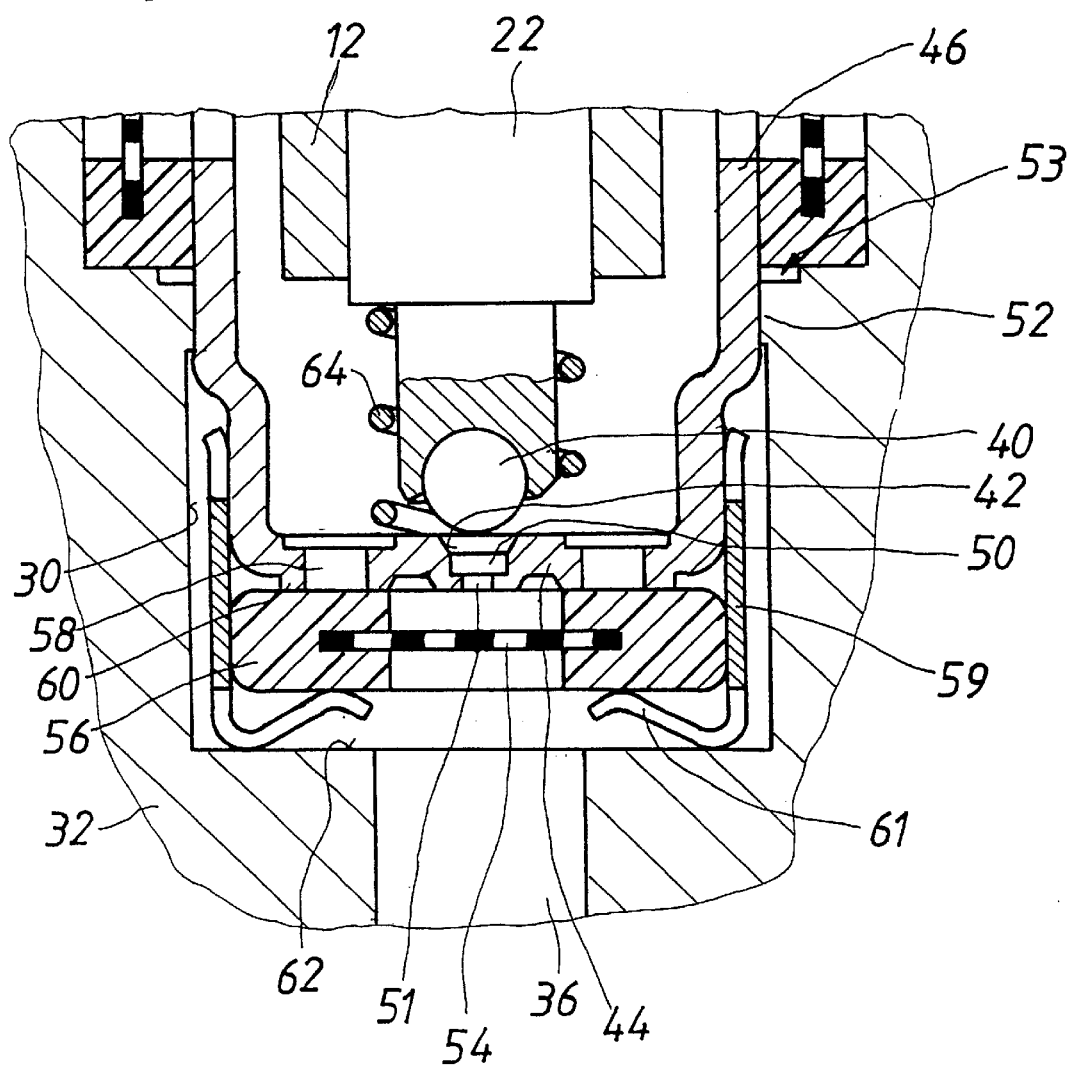
FIG. 2, an enlarged view of a detail indicated by the arrow II in FIG. 1.

FIG. 2, in an enlarged view, shows a region around a valve seat of the magnet valve 10 of the invention. A valve ball 40 is press-fitted as a valve closing body into a face end, remote from the armature 20, of the valve tappet 22. This ball cooperates with a conical valve seat 42, which is made in the bottom 44 of a cup-shaped sleeve 46 embodied as a deep-drawn sheet-metal part. The cup-shaped sleeve 46 is press-fitted onto the base body 12 and is joined to the base body 12 by crimping (reference numeral 48 in FIG. 1) at a plurality of points along the circumference. A flow opening 50 of the magnet valve 10 in the middle of the bottom 44 of the cup-shaped sleeve 46 and discharging at the valve seat 42 has a taper acting as a throttle restriction 51, which is necessary or at least advantageous for the sake of anti-lock braking. This throttle restriction 51 is vehicle-specific, or in other words is adapted to the particular vehicle in which the magnet valve 10 is to be used.

Sealing between the fluid conduits 36, 38 forming the valve inlet and outlet is effected at a shallow annular collar 52, protruding inward, of the blind bore 30 of the hydraulic block 32 on which the cup-shaped sleeve 46 of the magnet valve 10 inserted into the blind bore 30 rests sealingly. The annular collar 52 is made by reshaping the material of the hydraulic block 32 (reference numeral 53), in particular by embossing against a precisely shaped male die, not shown. This has the advantage that the blind bore 30 can be made without an undercut, that the diameter of the annular collar 52 can be fabricated very precisely with little tolerance, and that it has a short axial length, which keeps the forces involved in press-fitting the cup-shaped sleeve 46 into place.

A filter screen 54 of wire mesh or plastic mesh (mesh wire) is disposed on an outside of the bottom 44 of the cup-shaped sleeve 46, and its edge has a circular-annular plastic body extruded onto it. This plastic body forms a valve closing body 56 of a check valve that is integrated with the magnet valve 10 of the invention. This valve closing body 56 cooperates with a plurality of flow openings 58, which are disposed along an imaginary circle around the flow opening 50 of the magnet valve 10 in the bottom 44 of the cup-shaped sleeve 46. To improve the sealing function of the check valve, the flow openings 58 have circular collars 60, protruding in the direction of the valve closing body 56 and acting as valve seats, on which the valve closing body 56 rests sealingly when the check valve is closed.

A tubular sleeve 59 is press-fitted onto the cup-shaped sleeve 46; it protrudes axially past the bottom 44 of the cup-shaped sleeve 46 and positions the valve closing body 56 of the check valve. The tubular sleeve 59 has spring tongues 61 which are integral with it and are distributed equidistantly over the circumference and are bent over inward onto a side, remote from the cup-shaped sleeve 46, of the valve closing body 56 of the check valve. The spring tongues 61 press the valve closing body 56 of the check valve against the collars 60 that form the valve seats of the check valve. The check valve is spring-loaded. The tubular sleeve 59 is seated with its spring tongues 61 on a bottom 62 of the stepped bore 30, so that no special fastening of the tubular sleeve 59 to the cup-shaped sleeve 46 is required.

The function of the magnet valve 10 of the invention is as follows:

When the coil 24 is without current, a valve spring 64, which is inserted into the cup-shaped sleeve 46, presses axially against the valve tappet 22 and lifts the valve closing body 40 of the magnet valve 10 from its valve seat 42; the magnet valve 10 is opened. When current is supplied to the coil 24, the armature 20 is pulled axially in the direction of the base body 12, counter to the force of the valve spring 64, until the valve closing body 40 is seated on its valve seat 42 and the magnet valve 10 closes.

If an overpressure relative to the pressure on the outside of the bottom 42 prevails in the interior of the cup-shaped sleeve 46, or in other words if, when the magnet valve 10 of the invention is used as a pressure buildup valve of an ABS-equipped vehicle brake system, a higher pressure prevails in the fluid conduit 38 toward the wheel brake cylinder than in the fluid conduit 36 toward the master cylinder, then this overpressure lifts the valve closing body 56 of the check valve from its valve seats 60, so that brake fluid can flow through the flow openings 58 of the check valve regardless of the position of the magnet valve 10. As a result, the magnet valve 10 of the invention furnishes a multiple times larger flow cross section for the flow, designated as a return flow, from the wheel brake cylinder to the master cylinder than does the flow opening, provided with the throttle 51, of the magnet valve itself. This is advantageous for the sake of a rapid wheel brake pressure reduction at the end of a braking operation.

Figure 3:
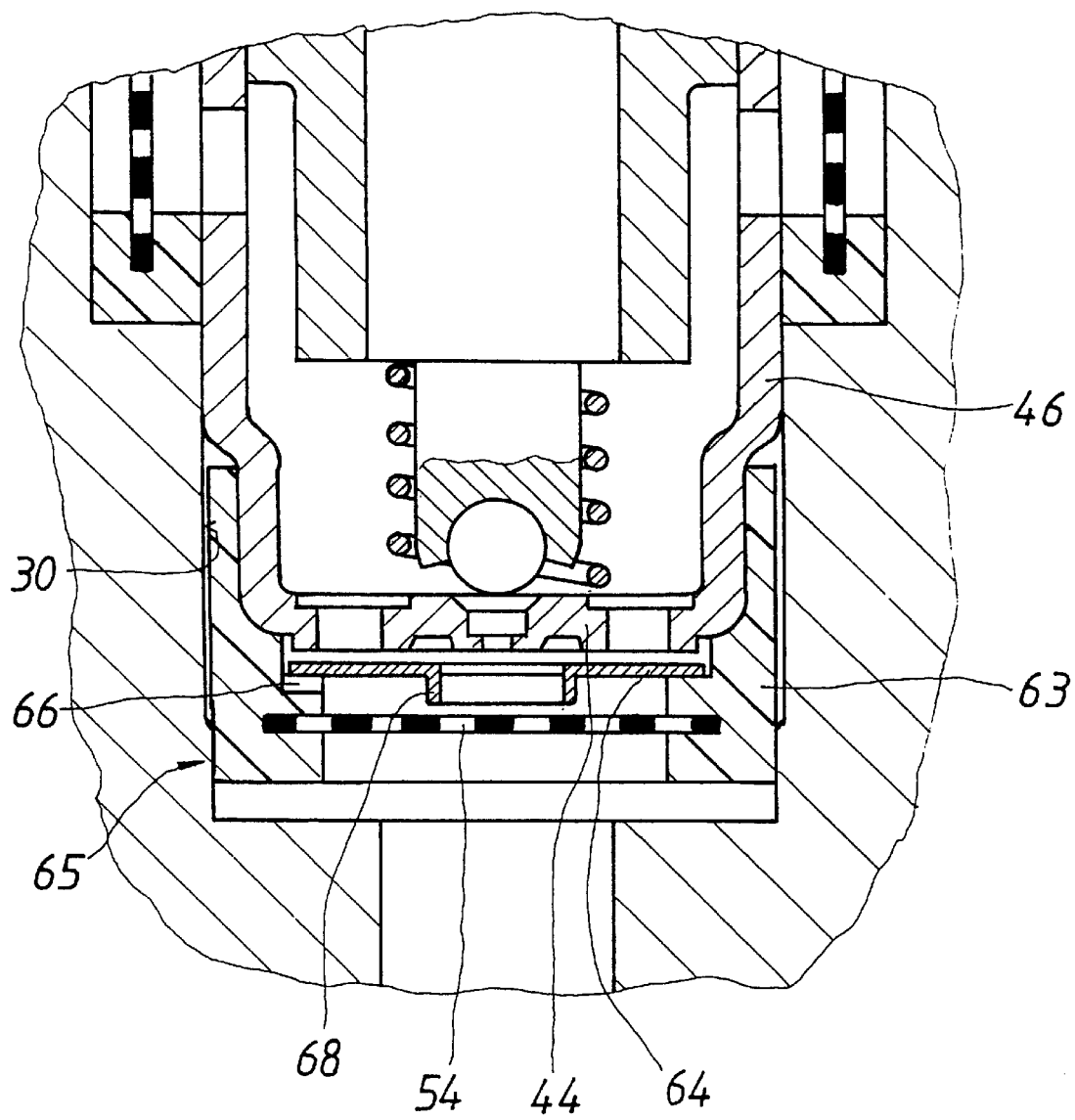
FIG. 3, a modified embodiment of the magnet valve shown in FIGS. 1 and 2, in a view corresponding to FIG. 2.

FIG. 3 shows an exemplary embodiment of a magnet valve 10 of the invention that is modified compared with FIG. 2.

In this magnet valve, the tubular sleeve 59 is omitted; the filter screen 54 is mounted solidly, with the annular plastic part 63 in which it is mounted, to the cup-shaped sleeve 46. As the valve closing body 64 of the check valve, the magnet valve of the invention shown in FIG. 3 has a sheet-metal disk, which is placed in the plastic part 63 in such a way that it can be raised axially from the bottom 44 of the cup-shaped sleeve 46 by the length of a valve stroke. The check valve of the magnet valve shown in FIG. 3 is springless.

The plastic part 63 is inserted with a press fit 65 into the blind bore 30 which presses the plastic part 63 against the cup-shaped sleeve 46 and thereby assures sealing both between the blind bore 30 and the plastic part 63 and between the plastic part 63 and the cup-shaped sleeve 46 and moreover securely fixes the plastic part 63.

At a plurality of points along the circumference, openings 66 extending around an edge of the valve closing body 64 of the check valve are disposed on the outside of the plastic part 63; they make a flow around the valve closing body 64 possible when the check valve is open.

The valve closing body 64 of the check valve is embodied as a perforated disk and has a low, hollow-cylindrical collar 68 on the edge of its perforations that protrudes away from the bottom 44 of the cup-shaped sleeve 46. This collar 68 serves to make valve closing bodies 64 readily separable in the automated assembly of the magnet valve 10 of the invention.

Otherwise, the magnet valve shown in FIG. 3 is embodied identically and functions identically to the magnet valve 10 shown in FIGS. 1 and 2. To avoid repetition, reference is made to the descriptions of those figures.

Figure 4:
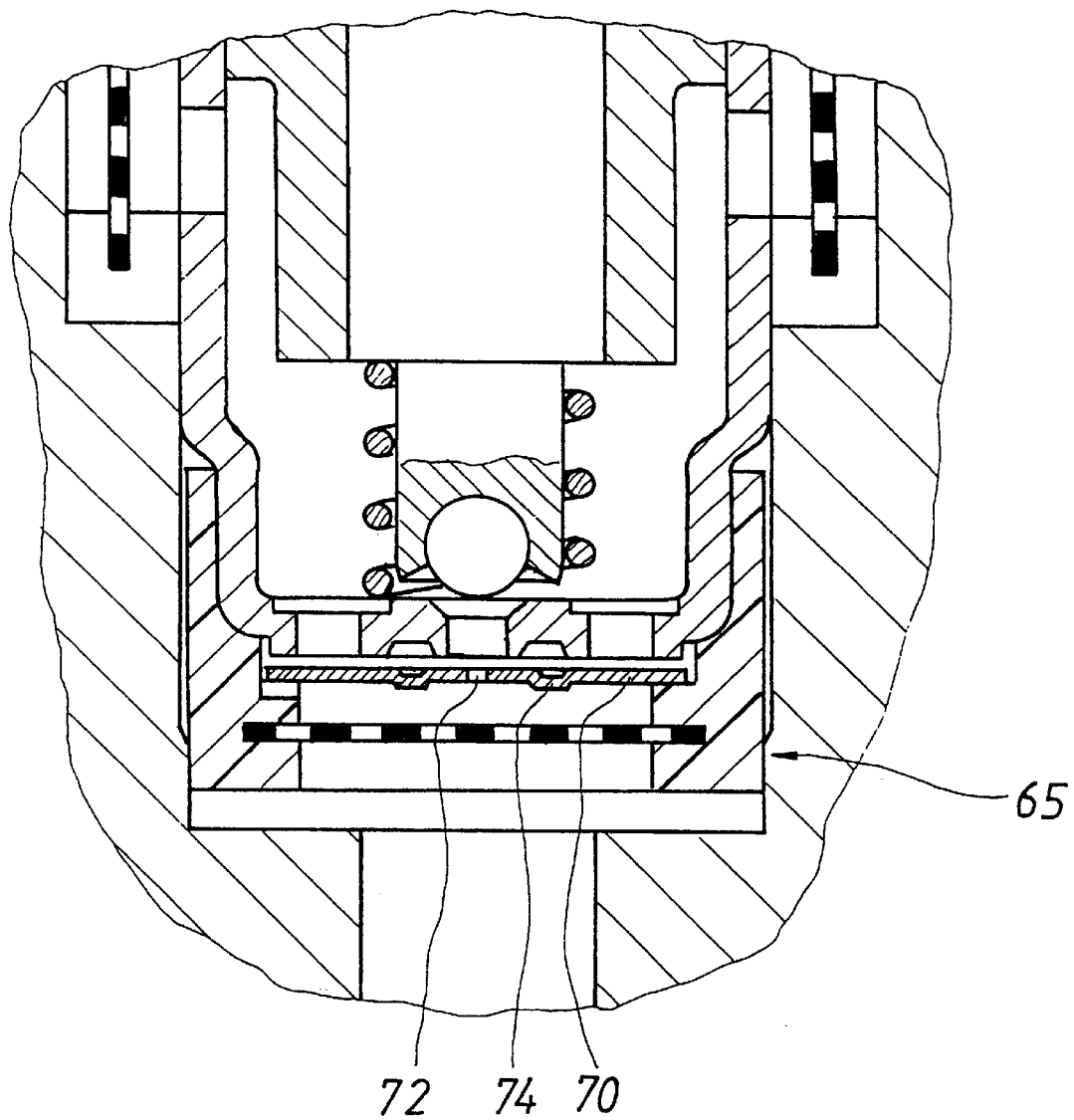
FIG. 4, a modification of the magnet valve shown in FIG. 3.

In FIG. 4, a detail is shown of a further feature of the magnet valve of the invention which is modified compared with FIG. 3. This magnet valve again has a disklike valve closing body 70 of the check valve. This valve closing body has a hole of small diameter in its middle, acting as a throttle 72 for the magnet valve. The throttle 51 (FIG. 2) in the bottom 44 of the cup-shaped sleeve 46 is omitted as a result, which makes its production simpler.

To improve the operation of separating a plurality of valve closing bodies 70, these bodies have embossed bases 74 as spacers. Otherwise, the magnet valve shown in FIG. 4 is of the same construction as the magnet valve shown in FIG. 3 and functions in the same way. To avoid repetition, reference is made to the corresponding descriptions of FIGS. 1–3.

The foregoing relates to a preferred exemplary embodiments of the invention, it being understood that other variants and embodiments thereof are possible within the spirit and scope of the invention, the latter being defined by the appended claims.

What is claimed is:

1. A magnet valve (10), comprising an armature (20) for actuating a valve closing body (40), a coil (24) for actuating the armature (20), a cup-shaped sleeve (46) in an interior of a hydraulic block (32) in which the valve closing body (40) is located and in a bottom (44) of said cup shaped sleeve a flow opening (50) having a valve seat (42) for the valve closing body (40) is mounted, and at least one further flow opening (58), disposed on the bottom (44) of the cup-shaped sleeve (46) laterally of the flow opening (50) for the armature-actuated valve closing body (40), a check valve (60, 56; 64, 70) having, a valve closing body (56; 64; 70) for closing the at least one further flow opening (58), the cup-shaped sleeve (46) is a shaped sheet-metal part made without metal-cutting machining, said bottom (44) has a plurality of said flow openings (58) for the check valve (60, 56; 64; 70) which are disposed along an imaginary circle around the flow opening (50) for the armature-actuated valve closing body (40), and that the valve closing body (56; 64; 70) of the check valve (56; 64; 70) is embodied in the form of an annular disk that extends along the bottom (44) on a side of the cup-shaped sleeve (46) remote from the armature-actuated valve closing body (40), and is retained by a component (59; 63) mounted on an outer circumference of the cup-shaped sleeve (46).

2. The magnet valve according to claim 1, in which the flow openings (58) for the check valve (56; 64; 70) have a circular collar, as a valve seat (60), that protrudes in a direction of the valve closing body (56) of the check valve.

3. The magnet valve according to claim 1, in which the valve closing body (64; 70) of the check valve (64; 70) is a sheet-metal part.

4. The magnet valve according to claim 3, in which the valve closing body (64; 70) of the check valve (64; 70) has spacers (68; 74).

5. The magnet valve according to claim 1, in which the valve closing body (56) of the check valve (56) is embodied as a frame of a filter screen (54).

6. The magnet valve according to claim 1, in which the check valve (56) has a closing spring element (61), which presses the valve closing body of the check valve against the bottom (44) of the cup-shaped sleeve (46).

7. The magnet valve according to claim 6, in which a tubular sleeve (59) is mounted on the cup-shaped sleeve (46) and has inward-protruding spring tongues (61) as closing spring elements for the check valve (56).

8. The magnet valve according to claim 1, in which the magnet valve (10) has a rod-like base body (12) with an axial through bore (14) through which a valve tappet (22) reaches, said valve topped connects the armature (20), which is located on one face end of the base body (12), to the valve closing body (40) on another face end of the base body (12), and that the cup-shaped sleeve (46) is mounted on a side of the base body (12) toward the valve closing body (40).

9. The magnet valve according to claim 1, in which the cup-shaped sleeve (46) has a press fit for sealing in a blind bore (30) of said hydraulic block (32), into which bore the magnet valve (10) is inserted.

10. The magnet valve according to claim 9, in which the blind bore (30) has a radial collar (52) for sealing at the cup-shaped sleeve (46), said collar is produced by reshaping the material comprising the hydraulic block (32).

11. The magnet valve according to claim 1, in which the flow opening (50) for the armature-actuated valve closing body (40) in the bottom (44) of the cup-shaped sleeve (46) is embodied as a throttle restriction (51).

12. The magnet valve according to claim 1, in that the valve closing body (70) of the check valve (70) has a throttle (72) for the magnet valve (10).

13. The magnet valve according to claim 1, in which the valve closing body (64; 70) of the check valve (64; 70) is chambered with play in the axial direction in a plastic part (63) that is mounted on the cup-shaped sleeve (46).

14. The magnet valve according to claim 13, in which the plastic part (63) has openings (66), which allow a flow around the valve closing body (64, 70) of the check valve when this body is lifted from the valve seats (60).

15. The magnet valve according to claim 13, in which the plastic part (63) has a press fit for sealing in the blind bore (30) of the hydraulic block (32), into which bore the magnet valve (10) is inserted.

16. The magnet valve according to claim 1, in which the valve closing body (70) of the check valve has a throttle (72) for the magnet valve.

17. The magnet valve according to claim 1, in which the valve closing body (64; 70) of the check valve is chambered with play is an axial direction in a plastic part (63) that is mounted on the cup-shaped sleeve (46).

18. The magnet valve according to claim 17, in which the plastic part (63) has openings (66), which allow a flow around the valve closing body (64; 70) of the check valve when this body is lifted from the valve seats (60).

19. The magnet valve according to claim 17, in which the plastic part (63) has a press fit for sealing in the blind bore (30) of the hydraulic block (32), into which bore the magnet valve (10) is inserted.

\* \* \* \* \*

UNITED STATES PATENT AND TRADEMARK OFFICE
CERTIFICATE OF CORRECTION

PATENT NO. : 6,084,493
DATED : July 4, 2000
INVENTOR(S) : Heinz Siegel

It is certified that error appears in the above-identified patent and that said Letters Patent is hereby corrected as shown below:

On the title page, Please correct the title to read as follows:
[54] MAGNET VALVE WITH INTEGRATED CHECK VALVE Signed and Sealed this Twenty-ninth Day of May, 2001

Attest:

NICHOLAS P. GODICI

*Attesting Officer*  *Acting Director of the United States Patent and Trademark Office*